United States Patent [19]
Trenkler

[11] 3,812,428
[45] May 21, 1974

[54] METHOD OF AND APPARATUS FOR THE MEASURING OF DIRECT CURRENT

[75] Inventor: Gerhard Trenkler, Braunschweig, Germany

[73] Assignee: Licentia Patent-Verualtungs-GmbH, Frankfurt, Germany

[22] Filed: Mar. 14, 1972

[21] Appl. No.: 234,586

[30] Foreign Application Priority Data
Mar. 15, 1971   Germany............................ 2112315

[52] U.S. Cl............. 324/127, 324/43 R, 324/117 R
[51] Int. Cl........................ G01r 33/00, G01r 33/02
[58] Field of Search................... 324/117 R, 127, 43

[56] References Cited
UNITED STATES PATENTS
| | | | |
|---|---|---|---|
| 3,135,911 | 6/1964 | Van Allen...................... | 324/117 R |
| 3,699,442 | 10/1972 | Riley.............................. | 324/117 R |
| 2,760,158 | 8/1956 | Kerns.............................. | 324/117 R |

Primary Examiner—Alfred E. Smith
Assistant Examiner—Ernest F. Karlsen
Attorney, Agent, or Firm—Spencer & Kaye

[57] ABSTRACT

An apparatus for the potential free measuring of direct current with direct time coding includes a magnetizable core. A premagnetization winding, a measuring winding and an induction winding are wound about the core. The direct current to be measured is fed to the measuring winding. The core can be placed in its saturated state at least partially by the periodically varying current flow in the premagnetization winding. An output voltage is developed by the induction winding as a result of the changing flux density in the core. A differentiating circuit is coupled to the induction winding for differentiating the output voltage thereof to produce a differentiated voltage. An interval determining circuit, operatively arranged to receive the differentiated voltage, determines the time intervals between the zero passages of the differentiated voltage as a measure of the magnitude and direction of the direct current. A method of measuring direct current is also described.

10 Claims, 13 Drawing Figures

METHOD OF AND APPARATUS FOR THE MEASURING OF DIRECT CURRENT

BACKGROUND OF THE INVENTION

This invention relates to a method of and apparatus for the potential free measuring of direct current. The present invention relates, more particularly, to a method of and apparatus for the potential free measuring of direct currents with direct time coding in which at least three separate windings wound about a magnetizable core are used. The magnetization loop of the core is controlled with the aid of one of the windings, hereinafter referred to as a premagnetization winding, to effect saturation. Another of the windings, a measuring winding carries the direct current to be measured. The third winding is an induction winding in which a voltage is induced as a result of the changing flux density in the core.

It is often highly desirable, in direct current measuring apparatuses and methods, to provide galvanic separation of the measuring circuit and the indicator circuit. The possibility of measuring the direct current without losses results.

It is known that direct currents can be measured, without direct conductive connections between the measuring and indicator circuits, by means of coils which have at least two windings and a core of magnetizable material whose magnetization loop is controlled into saturation by an alternating premagnetization flux. The direct current to be measured flows through one winding, the measuring winding, while the other winding, the premagnetization winding, is connected to an alternating voltage source to produce an alternating premagnetization flux. The current flowing in the measuring winding gives the current flowing through the premagnetization winding during one halfwave of the alternating voltage an approximately rectangular shape. The amplitude of this rectangular current is proportional to the control current, its magnitude resulting from the winding ratio of the measuring winding to the premagnetization winding. In order to be able to use this effect for the measurement, two of the above-described arrangements are usually connected with their measuring windings in series and with their premagnetization windings in counter-series. This produces a purely rectangular current in the premagnetization windings whose amplitude, after rectification in a diode bridge circuit, is a measure for the current flowing in the measuring winding. The measuring arrangement is simple in construction and provides good linearity, but it has the drawback that the current direction cannot be determined and the indication is indefinite in the vicinity of zero.

Another known technique for the potential free measuring of direct currents also employs a core of magnetizable material which bears a premagnetization winding and a measuring winding. The core is cyclically driven into saturation by an alternating current in the premagnetization winding. Thus the voltage across the premagnetization winding is no longer sinusoidal and it consequently contains higher harmonics. If the current to be measured equals zero, only odd-numbered harmonics are present. However, if the measuring current is other than zero, even-numbered harmonics also appear. The voltage of the second harmonic is used as a measure for the magnitude of the direct current in the measuring winding. Usually two of the described arrangements are connected with their measuring windings in series and with the premagnetization windings in counterseries so that a suppression of the undesired odd-numbered harmonics is obtained. In many cases a third winding, an induction winding, is applied to the cores from which then the voltage of the second harmonic is obtained. This measuring arrangement is also simple in construction, has a defined zero point and the direction of the measuring current can be determined; but it has the drawback that it is very nonlinear and that changes in the resistance of the measuring circuit produces large errors.

In a third technique for the potential free measuring of direct currents, use of a core of magnetizable material which bears a premagnetization winding and a measuring winding has also been proposed. In this instance, the core is not to be controlled into saturation by the premagnetization flux. The change in inductance of the premagnetization coil, resulting from direct current flow in the measuring winding, is to be utilized. Apparatuses using this technique would appear to be so faulty and expensive that they have not, to the knowledge of applicant, been reduced to practice.

The basic drawback of the above-described technique is that digital indication of the direct current to be measured is not possible; this can be accomplished only with the additional use of an analog-to-digital converter, which, however, requires not only additional apparatus but also results in a reduction in the measuring accuracy.

SUMMARY OF THE INVENTION

It is an object of the present invention to provide a method of and apparatus for the potential free measuring of direct current which overcomes the drawbacks mentioned above.

It is another object of the present invention to provide a method of and apparatus for the potential free measuring of direct current which are accurate in the vicinity of zero current and have good linearity.

It is a further object of the present invention to provide a method of and apparatus for the potential free measuring of direct current which provide a digital measuring value in direct time code for the magnitude of the direct current to be measured.

The foregoing objects, as well as others which will become apparent from the test which follows, in the apparatus aspect are accomplished by providing an apparatus for measuring direct current which includes a magnetizable core. A premagnetization winding, a measuring winding and an induction winding are wound about the core. During use, direct current to be measured is fed to the measuring winding and periodically varying current is fed to the premagnetization winding. The core can be placed in saturation at least partially by the current flow in the premagnetization winding. An output voltage is developed by the induction winding as a result of the changing flux density in the core. A differentiating circuit is coupled to the induction winding for differentiating the output voltage therefrom so as to produce a differentiated voltage. An interval determining circuit is coupled to a differentiating circuit for determining the time intervals between the zero passages of the differentiated voltage as a measure of the magnitude and direction of the direct current.

In the method aspect, the foregoing objects, as well as others which will become clear from the text which follows, are accomplished by a method for measuring direct current which includes supplying a periodically varying current to a premagnetization winding wound about a magnetizable core. The method involves feeding the direct current to be measured to a measuring winding wound about the core and inducing a voltage in an induction winding, also wound about the core, as a result of the changing flux density in the core. The output voltage from the induction winding is differentiated and the time intervals of the zero passages of the resulting differentiated voltage determined, the intervals being a measure of the magnitude and direction of the direct current.

Since the output from the interval determining circuit has essentially a digital nature, indication, storage and further processing of the signal, as well as long distance transmission of the signal as the measured value without interference, may be easily accomplished. Nonlinearities in the transmission path do not detract from the measurement. The apparatus required for an indication of the measured values can be of simple, conventional construction.

During operation of an apparatus according to the present invention, the induced voltage produced in the induction coil is differentiated and the time displacement of the zero passages of the differentiated induced voltage caused essentially by the action of the direct current to be measured is used as a measure for the intensity and direction of the direct current.

In order to mark the moment of zero passage, a preferred embodiment of the present invention feeds the differentiated induced voltage to an interval determining circuit whose output voltage suddenly changes its amplitude from one value to another when the differentiated induction voltage passes through zero in one direction and returns to the one value when it passes through zero in the other direction.

In order for the time intervals between the two voltage level changes in the opposite directions to be directly proportional to the magnitude of the direct current flowing in the measuring circuit, a further embodiment of the present invention provides two arrangements each having three windings, a magnetizable core, a differentiating circuit and an interval determining circuit. The two measuring windings are connected in series and the two premagnetization windings are connected in counterseries. The outputs from the two interval determining circuits are electrically connected together in such a manner that the time interval between two output voltage changes in the opposite direction constitutes a measure for the direct current to be measured.

In order to increase the steepness of the zero passage of the induced voltage and thus make the evaluation of the zero passages more dependable, without decreasing the sensitivity of the apparatus, the magnetizable core is preferably reduced in its transverse cross section over a certain length of the core and the induction winding is disposed above the portion of the core having the reduced cross section.

It is possible, in addition to the digital indication of the direct current to be measured, also to obtain an analog indication. This may be accomplished simply by providing an analog measuring circuit which determines the arithmetic mean value of a voltage. The differentiated induced voltage from the induction winding is fed to a circuit which suddenly changes the polarity of its output voltage when the differentiated voltage passes through zero, the amplitude of the output voltage being the same in both directions. This output voltage is fed to the circuit which determines the arithmetic mean value.

DETAILED DESCRIPTION OF THE PREFERRED EMBODIMENTS

Figure 1:
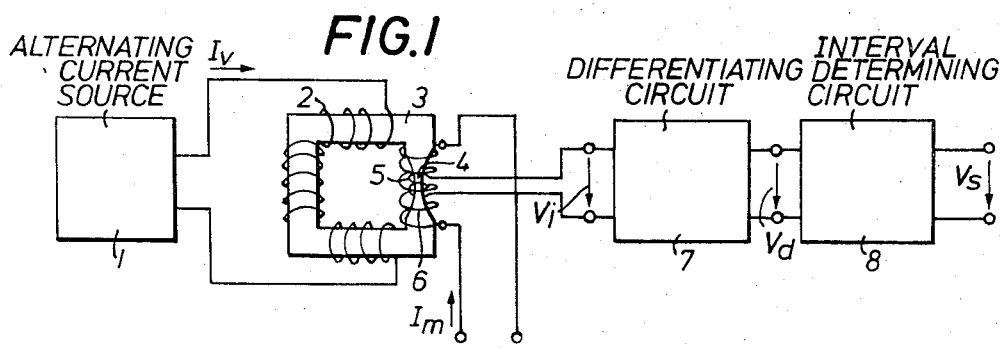
FIG. 1 is a schematic circuit diagram of a direct current measuring circuit according to a first embodiment of the present invention.

As shown in FIG. 1, an alternating current source 1 furnishes either a sinusoidal alternating current or a triangular alternating current $I_v$ to a premagnetization winding 2 which is positioned about a magnetizable core 3 of soft-magnetic material. The magnetizable core 3 has a portion of reduced cross section generally designated by the numeral 4. An induction winding 5 is wound about the portion 4 of reduced cross section. A measuring winding 6, which conducts the direct current to be measured is wound about the core above the induction winding 5. The induction winding 5 produces a voltage $v_i$ which is fed to a differentiating circuit 7, which in the simplest case may consist of a conventional C-R circuit. The differentiating circuit 7 produces an output voltage $v_d$ which is fed to an interval determining circuit 8. The interval determining circuit 8 produces an output voltage $v_s$ which is a measure of the magnitude and direction of the direct current to be measured.

The interval determining circuit can for example, include a voltage comparator of the type LM 111 manufactured by National Semiconductor Corporation in an integrated circuit technique. The response threshold zero volt can be verified for instance by a second voltage which in addition is fed into the voltage comparator LM 111.

Figure 2B:
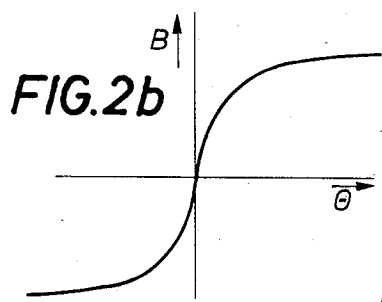
FIGS. 2a–2f are graphically represented waveforms helpful in understanding the operation of the circuit shown in FIG. 1.
Figure 2C:
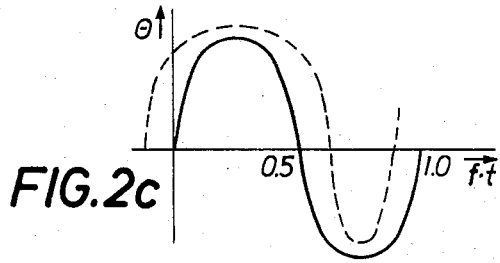
Figure 2A:
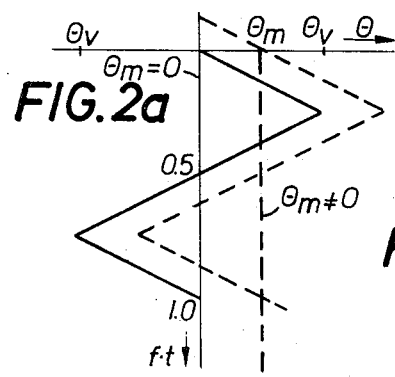
Figure 2D:
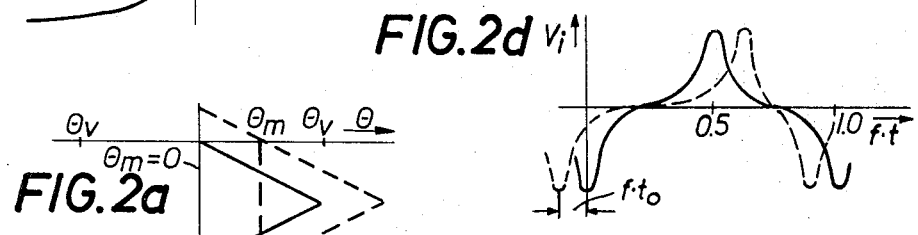

Referring now to FIGS. 2a–2f, the magnetization characteristic of the magnetizable core 3 is shown in FIG. 2b by an unequivocal curve, the hystereses and eddy current losses being neglected. The premagnetization flux $\theta_v$, which is illustrated as having a triangular shape along a time axis, and the measuring flux $\theta_m$, as shown in FIG. 2a, are added in their effect on the core 3. The magnitude of the core flux is determined by the number of turns constituting the measuring winding 6 and the premagnetization winding 2 and their respective currents. A mirror image of the resulting flux because of the magnetization characteristic of the core 3 results in a varying flux density B in the core as shown in FIG. 2c. The voltage $v_i$ induced in the induction winding 5 corresponds to the differential quotient of the flux density B in the core 3 as illustrated in FIG. 2d.

Figure 2E:
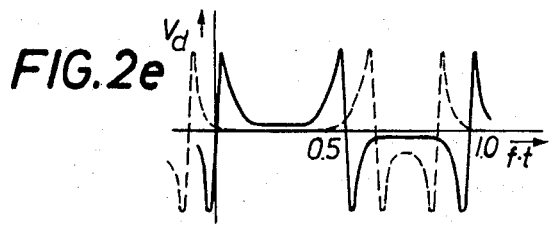

It can be seen from FIG. 2d that the extremes of the induced voltage are displaced under the influence of the current $I_m$ to be measured by the amount $f \cdot t_0$. The magnitude and direction of the shift is a measure for the field which is sensed. A direct evaluation of the shift of the extremes is very full of errors due to their dependence on amplitude. By differentiating the induced voltage the extremes become zero passages, as shown in FIG. 2e, which are independent in their time position of the amplitude and curve shape. The evaluation of the zero passages is effected by the interval determining circuit 8, in preferred embodiments, suddenly changing the polarity of its output voltage whenever the differentiated voltage passes through zero, the amplitude remaining constant.

Figure 2F:
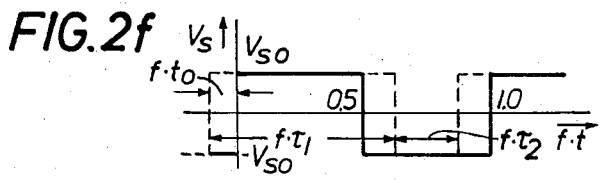

The voltage $v_s$ put out by the interval determining circuit 8 is a rectangular voltage whose rectangular width $f \cdot \tau_1$ or $f \cdot \tau_2$, respectively, shown in FIG. 2f, depends only on the magnitude of the current $I_m$ to be measured.

The mathematical relationship can be expressed as follows:

$$f\tau_{1 \text{ or } 2} = 0.5 \pm 2ft_0 (I_m).$$

(a)

In equation (a), $f$ indicates the frequency, $\tau$ the width of the rectangle and $t_0 (I_m)$ the time shift of the zero passages under the influence of the current to be measured. An analog measured value can also be obtained in a simple manner from the output voltage of the interval determining circuit by simply feeding its output voltage to a conventional volt meter which indicates the arithmetic mean of a voltage.

Figure 3:
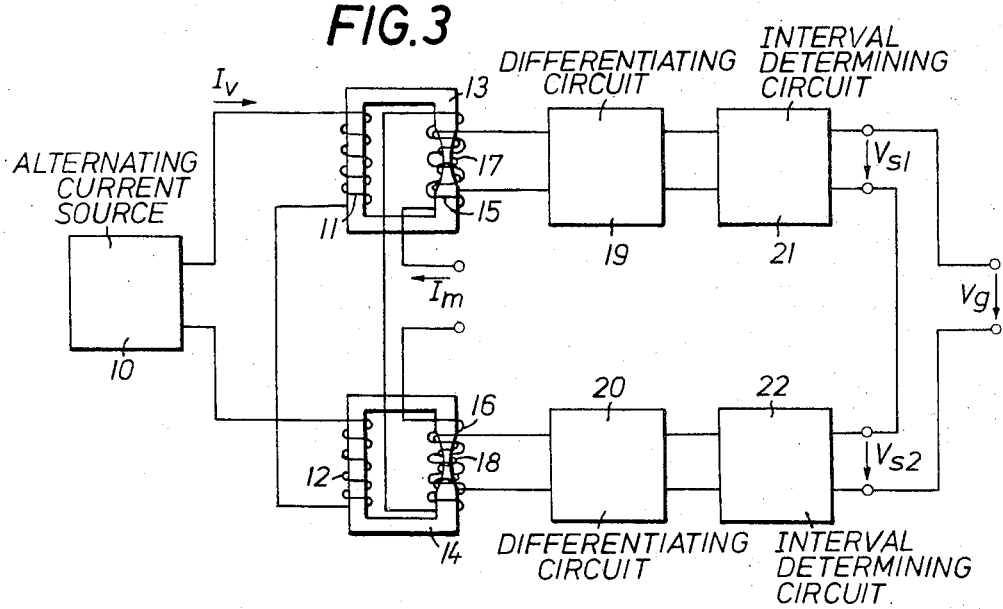
FIG. 3 is a schematic circuit diagram of a direct current measuring circuit having two magnetizable cores according to a second embodiment of the present invention.

FIG. 3 shows an alternating current source 10 which furnishes a current $I_v$ having either a triangular or sinusoidal shape, and which feeds two premagnetization coils 11 and 12 connected in counterseries with one another and wound respectively about magnetizable cores 13 and 14. Two measuring windings 15 and 16, through which the current $I_m$ to be measured flows, are connected in series with each other and are wound respectively on the cores 13 and 14. The induction windings 17 and 18 are wound respectively about the cores 13 and 14 which are constructed identically to the core 3 shown in FIG. 1, including a portion of reduced cross section. The coils 17 and 18 feed identical differentiating circuits 19 and 20, respectively. The output from each of the differentiating circuits 19 and 20 is coupled respectively to identical interval determining circuits 21 and 22 which produce respectively voltages $v_{s1}$ and $v_{s2}$, the output connections from the interval determining circuits 21 and 22 being connected in series for combining the voltages $v_{s1}$ and $v_{s2}$ to produce a composite voltage $v_y$. The voltages $v_{s1}$ and $v_{s2}$ are combined so that a difference voltage $v_y$ results.

Figure 4B:
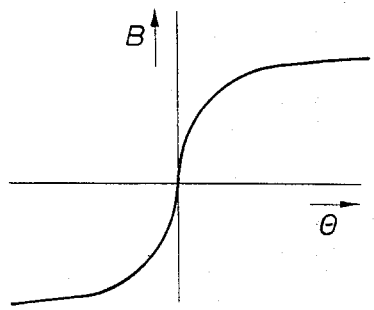
FIGS. 4a–4e are graphically represented waveforms helpful in understanding the operation of the circuit shown in FIG. 3.
Figure 4C:
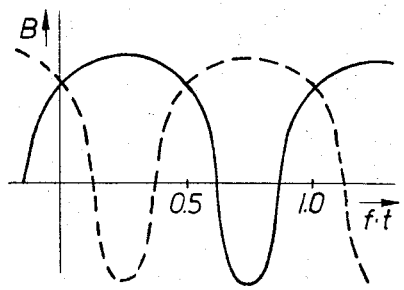
Figure 4A:
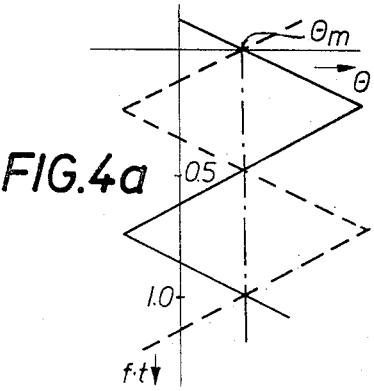
Figure 4D:
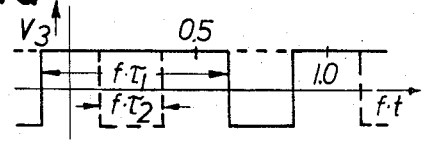

The operation of the circuit shown in FIG. 3 will now b explained, reference being made to FIGS. 4a–4e. The magnetization loop of the magnetizable cores 13 and 14 is shown in FIG. 4b as an unequivocal curve. The premagnetization fluxes and themeasuring the measuring are added in their effect on the individual cores 13 and 14. The resulting flux in the core 13 is shifted in phase with respect to the flux in the core 14 by $f \cdot t = 0.5$ as shown in FIG. 4a by the solid and short-dashed lines, respectively. Correspondingly, two varying flux densities B shifted in phase by $f \cdot t = 0.5$, as shown respectively in FIG. 4c by the solid and short-dashed curves, result in the cores 13 and 14, respectively. The voltages induced in the induction windings 17 and 18 are separately differentiated in the individual channels, as described in detail above, and are evaluated in their zero passages. At the outputs from the interval determining circuits 21 and 22 there are obtained two rectangular voltages $v_{s1}$ and $v_{s2}$, respectively, having the rectangular width $f \cdot \tau_1$ and $f \cdot \tau_2$, respectively, as shown in FIG. 4d. The two voltages $v_{s1}$ and $v_{s2}$ are combined in opposition to one another, the combined output voltage $v_y$ being a sequence of rectangular pulses with the width $f \cdot \tau_3/2$, where $$f \cdot \tau_3 = 4f \cdot t_0 (I_m).$$

(b)

Figure 4E:
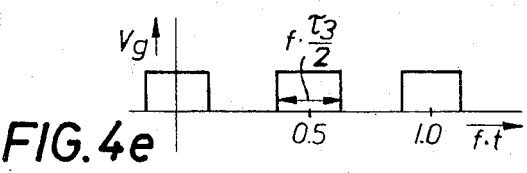

In equation (b), $f$ indicates the frequency, $\tau_3/2$ the width of the rectangle and $t_0 (I_m)$ the time shift of the zero passages under the influence of the current to be measured as can be seen in FIG. 4e, the pulses follow at a spacing of $f \cdot t = 0.5$. Thus, this differentiating arrangement produces a doubling of the sensitivity and eliminates the annoying summand 0.5 in the equation for the time shift in the simple measuring arrangement. Furthermore, residual effects of the premagnetization flux on the measuring circuit are reduced.

The advantages realizable with the present invention consist in particular in that the time interval between two consecutive zero passages is used as a measure of the direct current $I_m$ to be measured instead of, as in prior art embodiments, the level of the amplitude of an alternating voltage. This again produces a very simple and error-free digitalization of the measured value without the need for an analog-to-digital converter. If the zero passages of the differentiated voltage are evaluated by an interval determining circuit, the measured values representing the direct current can be transmitted over long distances even in the presence of interference and over paths having nonlinearities without thereby producing errors. In contradistinction to the prior measuring arrangements, the digital signals can be regenerated and amplified at very little expense and without difficulty.

It will be understood that the above description of the present invention is susceptible to various modifications, changes and adaptations, and the same are intended to be comprehended within the meaning and range of equivalents of the appended claims.

I claim:

1. In an apparatus for the potential free measuring of direct current with direct time coding, the apparatus including a magnetizable core, a premagnetization winding wound about said core which may be placed in its saturation state at least partially by periodically varying current in said premagnetization winding, a measuring winding wound about said core for carrying the direct current to be measured and an induction winding wound about said core for developing an output voltage in response to the changing flux density in said core, the improvement comprising differentiating means coupled to said induction winding and responsive to its output voltage for producing a differentiated voltage therefrom, and interval determining means coupled to said differentiating means and responsive to its differentiated voltage for determining the time intervals of the zero passages of the differentiated voltage as a measure of the magnitude and direction of the direct current to be measured.

2. An arrangement as defined in claim 1 wherein said interval determining means responsive to the differentiated voltage includes a square wave producing circuit for producing an output voltage wave which changes from a first value to a second value during zero passages of the differentiated voltage in one direction and from the second value back to the first value during zero passages of the differentiated voltage in the opposite direction.

3. An arrangement as defined in claim 1 wherein said magnetizable core has a portion along its length of reduced cross section and said induction winding is disposed about said portion of reduced cross section.

4. An arrangement as defined in claim 1 wherein said interval determining means responsive to the differentiated voltage includes a square wave producing circuit for producing an output voltage wave which changes from a first polarity and given magnitude to the opposite polarity and the same magnitude during zero passages of the differentiated voltage in one direction and from the opposite polarity and given magnitude back to the first polarity and same magnitude during zero passages of the differentiated voltage in the opposite direction.

5. An arrangement as defined in claim 1 further comprising a second magnetizable core; a second premagnetization winding, said second premagnetization winding being positioned about said second premagnetization core, said first and second premagnetization windings being connected in series with each other in phase opposition; a second measuring winding positioned about said second core, said first and second measuring windings being connected in series with each other; a second induction winding, said second induction winding being positioned about said second core; a second differentiating means coupled to said second induction winding and responsive to its output voltage for producing a second differentiated voltage; second interval determining means coupled to said second differentiating means and responsive to its differentiated voltage; and means for connecting the outputs of both said interval determining means in series with each other.

6. An arrangement as defined in claim 1 further comprising a source of sinusoidal alternating current coupled across said premagnetization winding.

7. An arrangement as defined in claim 1 further comprising a source of triangular alternating current coupled across said premagnetization winding.

8. An arrangement as defined in claim 5 further comprising a source of sinusoidal alternating current coupled across said series connected premagnetization windings.

9. An arrangement as defined in claim 5 further comprising a source of triangular alternating current coupled across said series connected premagnetization windings.

10. A method of determining direct current comprising:
supplying a periodically varying current to a premagnetization winding wound about a magnetizable core,
feeding the direct current to be measured to a measuring winding wound about the core,
inducing a voltage in an induction winding wound about the core as a result of the changing flux density in the core,
differentiating the output voltage from the induction coil, and
determining the time intervals of the zero passages of the differentiated voltage produced by the preceding step as a measure of the magnitude and direction of the direct current being measured.

* * * * *

UNITED STATES PATENT OFFICE
CERTIFICATE OF CORRECTION

Patent No. 3,812,428          Dated     May 21st, 1974

Inventor(s) Gerhard Trenkler

It is certified that error appears in the above-identified patent and that said Letters Patent are hereby corrected as shown below:

In the heading of the patent, line 5, change "Licentia Patent-Veruraltungs-GmbH" to --Licentia Patent-Verwaltungs-GmbH--; Column 2, line 49, change "test" to --text--;

Column 5, line 58, change "b explained" to --be explained--, line 61, delete "themeasuring", line 62, before "are" insert --fluxes--.

Signed and sealed this 19th day of November 1974.

(SEAL)
Attest:

McCOY M. GIBSON JR.            C. MARSHALL DANN
Attesting Officer              Commissioner of Patents